US 7,801,090 B2

United States Patent
Mottier et al.

(10) Patent No.: US 7,801,090 B2
(45) Date of Patent: Sep. 21, 2010

(54) WIRELESS TELECOMMUNICATION SYSTEM INCLUDING AT LEAST A BASE STATION INTENDED TO COMMUNICATE WITH TERMINALS

(75) Inventors: David Mottier, Rennes Cedex (FR); Loic Brunel, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1080 days.

(21) Appl. No.: 11/488,615

(22) Filed: Jul. 19, 2006

(65) Prior Publication Data

US 2007/0019667 A1   Jan. 25, 2007

(30) Foreign Application Priority Data

Jul. 21, 2005   (EP)   ................... 05291571
Sep. 22, 2005   (EP)   ................... 05291972

(51) Int. Cl.
*H04J 3/00* (2006.01)
(52) U.S. Cl. .................. 370/336; 455/522; 370/350; 370/508
(58) Field of Classification Search ................. 370/337, 370/336, 350, 508; 455/522
See application file for complete search history.

(56) References Cited

U.S. PATENT DOCUMENTS 5,548,582 A * 8/1996 Brajal et al. ................. 370/206
5,959,982 A * 9/1999 Federkins et al. ........... 370/336
6,810,023 B1   10/2004 Dillinger et al.
2004/0082356 A1 * 4/2004 Walton et al. ................ 455/522
2009/0201893 A1 * 8/2009 Majima ....................... 370/337

FOREIGN PATENT DOCUMENTS

EP   1 233 566 A1   8/2002
EP   1 511 190 A1   3/2005

* cited by examiner

*Primary Examiner*—Seema S Rao
*Assistant Examiner*—Wanda Z Russell
(74) *Attorney, Agent, or Firm*—Oblon, Spivak, McClelland, Maier & Neustadt, L.L.P.

(57) ABSTRACT

The present invention concerns a wireless telecommunication system including at least a base station intended to communicate with terminals over bidirectional communication channels, each channel supporting frames being divided into downlink timeslots and uplink timeslots, each downlink timeslot including a number of symbols intended to be transmitted to at least a terminal, a terminal after having received all the symbols included in a downlink timeslot followed by an uplink timeslot transmits other symbols over said uplink timeslot with a time delay depending on the distance between said terminal and said base station so that the so transmitted symbols are received by said base station at a time separated from the end of the transmission by the base station of the downlink timeslot by a predefined guard period constant whatever said distance, and the base station transmits at least a supplementary downlink symbol during the guard period to terminals that can receive said at least supplementary downlink symbol during the time delays thereof and/or receives during the guard period at least a supplementary uplink symbol from the terminals that can transmit said at least supplementary uplink symbols during the time delays thereof.

28 Claims, 5 Drawing Sheets

WIRELESS TELECOMMUNICATION SYSTEM INCLUDING AT LEAST A BASE STATION INTENDED TO COMMUNICATE WITH TERMINALS

BACKGROUND

The present invention relates to a wireless telecommunication system including at least a base station intended to communicate with terminals over bidirectional communication channels.

Note that wireless telecommunication systems include mobile telecommunication systems in which mobile terminals may move over long distances and sometimes quickly but also telecommunication systems in which the terminals are fixed or may only move over short distances relative to the base station which they are connected to and often very slowly.

FIG. 1 diagrammatically shows a wireless cellular telecommunication system serviced by base stations, here two base stations BTS1 and BTS2, each intended to communicate with at least one terminal, here two terminals TE1 and TE2 communicating with the base station BTS1 over wireless communication channels CH1 and CH2, respectively. At the moment of the FIG. 1, the terminal TE1 is at a distance d1 from the base station BTS1 whereas the terminal TE2 is at a distance d2 from the base station BTS1. The area covered by a base station BTS is generally called a cell, the border of said cell being at a distance of the base station considered as maximal.

Each channel CHi (i=1, 2) is intended to support an uplink ULi for carrying information from the terminal TEi to the base station BTS and a downlink DLi for information from the base station BTS to the terminal TEi. Said information is enclosed within frames split into time slots allocated either to the uplink ULi or to the downlink DLi.

The frame is for example of the type depicted in FIG. 2, i.e. of the HD/OFDM type (standing for Half Duplex/Orthogonal Frequency Division Multiplex/OFDM) either TDD/OFDM (Time Division Duplex/OFDM) or FDD/OFDM (Frequency Division Duplex). As it can be seen at FIG. 2, this frame is subdivided into an integer number L of time slots TS1 to TSL that can be allocated either to the downlink DL or to the uplink UL. Furthermore, each time slot TSj (j=1 to L) supports $q_j$ symbols s1 to $sq_j$ (here, for the time slot TSj, $q_j$=8), called OFDM symbols, respectively carried by k orthogonal modulation frequencies f1 to fk. Note that each of the OFDM symbols s1 to $sq_j$ in a time slot TSj generally includes a cyclic prefix that is used to combat inter-symbol interference.

It must be understood that in a general case the number of symbols per time slot can vary from a time slot to another.

In relation with FIG. 3, let's consider the transmission at time te of $q_j$=eight symbols s1 to s8 over the downlink DL by a base station BTS. These symbols s1 to s8 are received by a terminal TEref at the border of the considered cell (at a distance dref from the base station BTS) at a time equal to te+RTD(dref)/2 (RTD(dref) being the Round Trip Delay for that terminal TEref at said distance dref from the base station BTS). These symbols are processed by the terminal which then transmits also symbols over the Uplink UL. Before transmitting over the uplink, a terminal has to wait for a period of time, said Receive Transmit Switch time or simply switching time and referred to as RTS, in order to take into account the duration of hardware and software operations. For instance, this delay RTS is the maximum of the time needed by hardware equipments of the terminals to switch between reception and transmission and the time needed by hardware equipments of the base station to switch between transmission and reception. The symbols transmitted over the uplink UL are received at the base station BTS at a time tr equal to te+RTD(dref)+RTS+$D_{DL}$, $D_{DL}$ being the total duration of the $q_j$ symbols. It can thus be seen that the base station BTS has to wait for the reception of the symbols transmitted by a terminal located at the border of the cell in order to perform the processing thereof. The waiting time is called the Guard Period GP and must be equal at least to the round trip delay RTD(dref) plus the Receive Transmit Switch time RTS.

Guard periods GP between downlinks DL and uplinks UL can be seen on FIG. 2.

For those terminals that are closer to the base station BTS than the one TEref above considered, a timing delay TD(d) is generally determined and applied for the transmission of symbols over the uplink UL in such a manner that the transmitted symbols are received at the base station BTS from all the terminals TE connected thereto at the same time tr. In other words, the guard period GP is constant whatever the distance separating the considered terminal from the base station BTS.

Note that in the litterature, the notion of timing advance TA is well-known. The timing delay TD as aforedefined can be linked to the timing advance TA by considering the guard period GP as follows:

$$TA = GP - TD$$

SUMMARY

The problem addressed by the telecommunication system afore described is related to a potential loss of resources resulting from the fact that during the guard period GP no information of any sort is transmitted.

Note that for very large cells, the duration of the guard period can be greater than the duration of the $q_j$ symbols of a timeslot.

The present invention aims at solving the aforementioned problem by providing a wireless telecommunication system including base stations intended to communicate with terminals over bidirectional communication channels, said system being such that a better using of the resources can be performed.

The present invention thus concerns a wireless telecommunication system including at least a base station intended to communicate with terminals over bidirectional communication channels, each channel supporting frames being divided into downlink timeslots and uplink timeslots, each downlink timeslot including a number of symbols intended to be transmitted to at least a terminal, a terminal after having received all the symbols included in a downlink timeslot followed by an uplink timeslot transmits other symbols over said uplink timeslot with a time delay depending on the distance between said terminal and said base station so that the so transmitted symbols are received by said base station at a time separated from the end of the transmission by the base station of the downlink timeslot by a predefined guard period constant whatever said distance, characterized in that the base station comprises means for transmitting at least a supplementary downlink symbol during the guard period to terminals that can receive said at least supplementary downlink symbol during the time delays thereof and/or means for receiving during the guard period at least a supplementary uplink symbol from terminals that can transmit said at least supplementary uplink symbol during the time delays thereof.

A wireless telecommunication system according to the invention may comprise:

means for determining the time delay of each terminal connected thereto, means for allowing a base station to transmit to a terminal at distance d from a base station and the time delay of which is comprised between the duration of a number $n_{d1}$ of downlink symbols and the duration of a number $n_{d1}+1$ of downlink symbols, respectively plus the time RTS of switching from the reception mode into the transmission mode, at most $n_{d1}$ supplementary downlink symbols, and means for allowing said terminal to receive and process said $n_{d1}$ supplementary downlink symbols.

It may also comprises means for determining the time delay of each terminal connected thereto, means for allowing a terminal at distance d from the base station and the time delay of which is comprised between the duration of a number $n_{u1}$ of uplink symbols and the duration of a number $n_{u1}+1$ of uplink symbols, respectively plus the time RTS of switching from the reception mode into the transmission mode, to transmit at most $n_{u1}$ supplementary uplink symbols, means for allowing the base station to receive and process said at most $n_{u1}$ supplementary uplink symbols.

According to an aspect of the invention, the means for determining the time delay of a terminal at distance d from a base station includes means for subtracting to the value of the guard period the value of the round trip delay RTD(d) for that terminal. The value of the guard period is advantageously given by the value of the round trip delay RTD(dref) for a terminal that is at a predetermined reference distance dref from the considered base station plus the time RTS of switching from the reception mode into the transmission mode.

According to an aspect of the invention, it comprises means for informing each terminal connected thereto about the time delay it has to apply.

According to an aspect of the invention, as long as the time delay for a terminal is not determined, no information is included within any supplementary symbol.

According to an aspect of the invention, as long as the time delay for a terminal is not determined, the time delay for that terminal is considered as to be equal to the guard period.

According to an aspect of the invention, said base station uses modulation, coding and/or multiplexing schemes for the supplementary symbols that are different from those that it uses for the symbols of the reference time slots, said base station transmitting specific control information to the terminals that can receive that supplementary symbols for said terminals to detect, decode and de-multiplex said supplementary symbols.

According to an aspect of the invention, the base station includes the specific control information related to a supplementary symbol within this supplementary symbol.

The present invention also concerns a base station of a wireless telecommunication system, said base station being intended to communicate with terminals over bidirectional communication channels, each channel supporting frames being divided into downlink time slots and uplink time slots, each downlink time slot including a number of symbols intended to be transmitted to at least a terminal.

According to the invention, said base station comprises means for determining the time delay of each terminal connected thereto, said time delay being such that any terminal after having received all the symbols included in a downlink timeslot followed by an uplink timeslot transmits other symbols over said uplink timeslot with said time delay so that the transmitted symbols are received by said base station at a time separated from the end of the transmission by the base station of the downlink timeslot by a predefined guard period constant whatever said distance, means for transmitting at least a supplementary downlink symbol during the guard period to terminals that can receive said at least supplementary downlink symbol during the time delays thereof and/or means for receiving during the guard period at least a supplementary uplink symbol from terminals that can transmit said at least supplementary symbol during the time delays thereof.

According to an aspect of the invention, said base station BTS comprises means for transmitting to a terminal at distance d from a base station and the time delay of which is comprised between the duration of a number $n_{d1}$ of downlink symbols and the duration of a number $n_{d1}+1$ of downlink symbols, respectively plus the time RTS of switching from the reception mode into the transmission mode, at most $n_{d1}$ supplementary downlink symbols.

According to an aspect of the invention, said base station BTS comprises means for receiving from a terminal at distance d from the base station and the time delay of which is comprised between the duration of a number $n_{u1}$ of uplink symbols and the duration of a number $n_{u1}+1$ of uplink symbols, respectively plus the time RTS of switching from the reception mode into the transmission mode, at most $n_{u1}$ supplementary uplink symbols.

According to an aspect of the invention, it comprises means for informing each terminal connected thereto about the time delay it has to apply.

According to an aspect of the invention, it uses modulation, coding and/or multiplexing schemes for the supplementary symbols that are different from those that it uses for the symbols of the reference time slots, said base station transmitting specific control information to the terminals that can receive that supplementary symbols for said terminals to detect, decode and de-multiplex said supplementary symbols.

According to an aspect of the invention, it includes the specific control information related to a supplementary symbol within this supplementary symbol.

The present invention concerns also a terminal of a wireless telecommunication system as afore-described that is characterized in that it comprises means for receiving and processing supplementary downlink symbols during the time delay thereof.

According to an aspect of the invention, said terminal comprises means for determining from the value of the time delay it has to apply, the number $n_{d1}$ of downlink supplementary symbols it has to receive and process.

The present invention concerns also a terminal of a wireless telecommunication system as afore-described that is characterized in that it comprises means for transmitting supplementary uplink symbols during its time delay thereof.

According to an aspect of the invention, it comprises means for determining from the value of the time delay it has to apply, the number $n_{u1}$ of uplink supplementary symbols it has to transmit during said time delay period.

Furthermore, the present invention concerns a transmission method in a wireless telecommunication system including at least a base station intended to communicate with terminals over bidirectional communication channels, each channel supporting frames being divided into downlink timeslots and uplink timeslots, each downlink timeslot including a number of symbols intended to be transmitted to at least a terminal, said method including the steps of transmitting from the base station to terminals symbols included in a downlink timeslot, receiving by each terminal the symbols included in said downlink timeslot, transmitting by each terminal other symbols over a subsequent uplink timeslot with a time delay depending on the distance between said terminal and said base station so that the so transmitted symbols are received by said base station at a time separated from the end of the transmission by the base station of the downlink timeslot by a predefined guard period constant whatever said distance, According to the invention, it includes a step of transmitting by the base station at least a supplementary downlink symbol during the guard period to terminals that can receive said at least supplementary downlink symbol during the time delays thereof and/or a step of receiving by said base station during the guard period at least a supplementary uplink symbol from terminals that can transmit said at least supplementary symbol during the time delays thereof.

According to an aspect of the invention, it includes the steps of determining the time delay of each terminal connected to the base station, allowing said base station to transmit to a terminal at distance d from a base station and the time delay of which is comprised between the duration of a number $n_{d1}$ of downlink symbols and the duration of a number $n_{d1}+1$ of downlink symbols, respectively plus the time RTS of switching from the reception mode into the transmission mode, at most $n_{d1}$ supplementary downlink symbols, and allowing said terminal to receive and process said $n_{d1}$ supplementary symbols.

According to an aspect of the invention, it includes the steps of determining the time delay of each terminal connected to the base station, allowing a terminal at distance d from the base station and the time delay of which is comprised between the duration of a number $n_{u1}$ of uplink symbols and the duration of a number $n_{u1}+1$ of uplink symbols, respectively plus the time RTS of switching from the reception mode into the transmission mode, to transmit at most $n_{u1}$ supplementary uplink symbols, and allowing the base station to receive said at most $n_{u1}$ supplementary uplink symbols.

According to an aspect of the invention, it comprises a step for informing each terminal connected thereto about the time delay it has to apply.

According to an aspect of the invention, it includes a step of using modulation, coding and/or multiplexing schemes for the supplementary symbols that are different from those used for the symbols of the reference time slots, said base station transmitting specific control information to the terminals that can receive that supplementary symbols for said terminals to detect, decode and to de-multiplex said supplementary symbols.

According to an aspect of the invention, the specific control information related to a supplementary symbol is included within this supplementary symbol.

The characteristics of the invention mentioned above, as well as others, will emerge more clearly from a reading of the following description given in relation to the accompanying figures, amongst which:

DETAILED DESCRIPTION

According to the drawings depicting the present invention, a symbol that is being transmitted is represented with a thin line whereas a symbol that is being received is represented with a thicker line.

Figure 1:
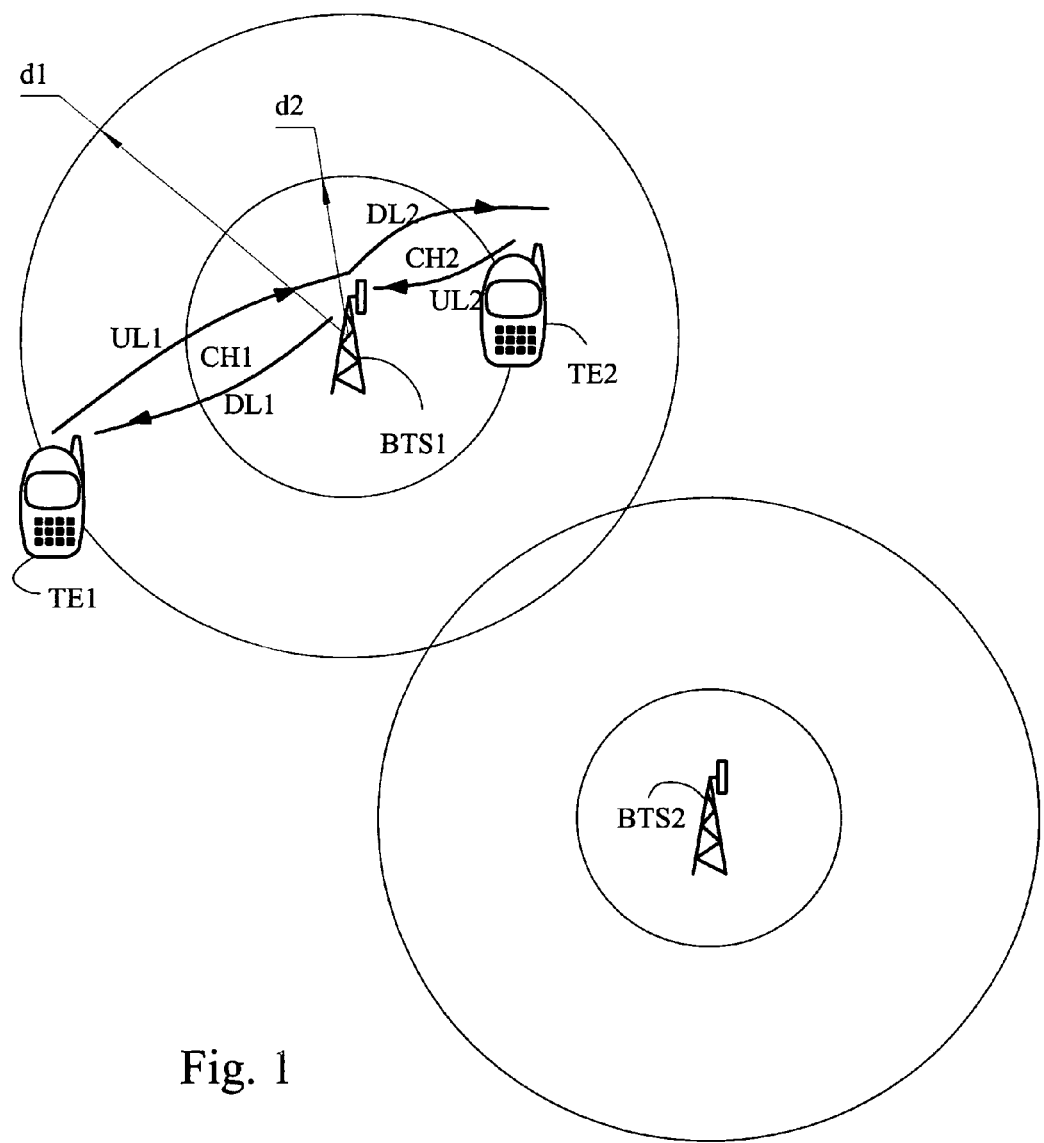
FIG. 1 is a schematic diagram depicting a telecommunication system in which a method according to the invention will be advantageously used for transmitting information.
Figure 2:
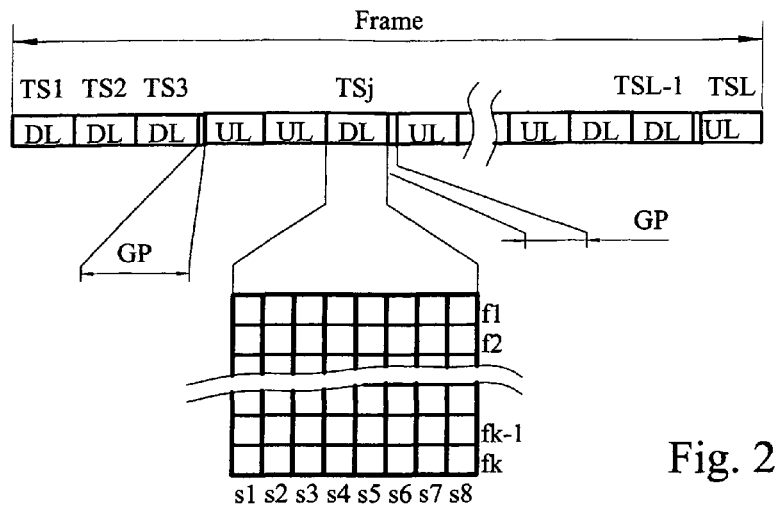
FIG. 2 is a chronogram depicting the structure of a conventional HD/OFDM frame.
Figure 3:
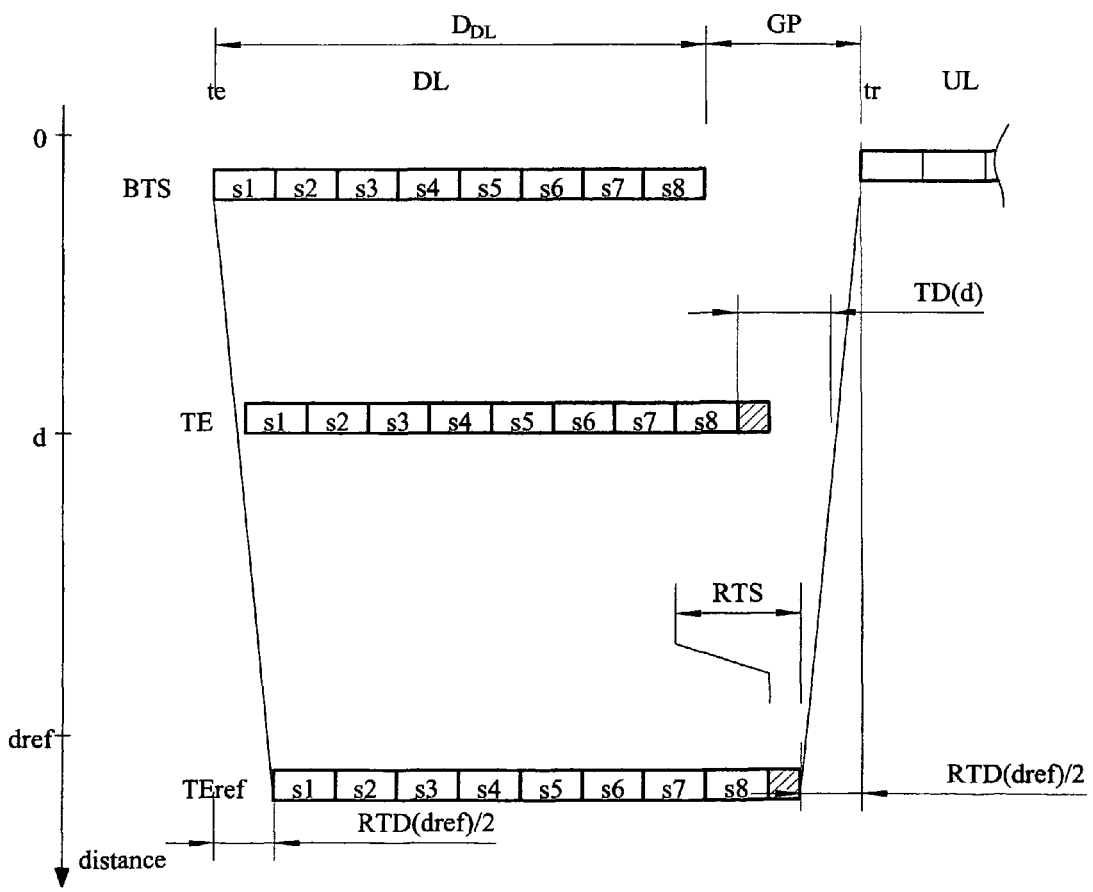
FIG. 3 is a chronogram depicting the transmission of information in the downlink of a telecommunication system according to the state of the art.

The present invention can be carried out by a wireless telecommunication system such the one depicted in FIG. 1 and using frames of the half duplex (HD) type as shown in FIG. 2, for instance either of the TDD type or of the HD/FDD in which terminals transmit and receive signals on different frequency bands but also during different timeslots.

In both cases of TDD and HD FDD systems, as it will be seen, guard periods are needed between downlink and uplink timeslots, and timing advance is applicable similarly. So the invention is also applicable to HD FDD.

Note however that in FDD, a base station may in parallel communicate with both terminals having Full Duplexing (FD) capability for which the invention does not apply and terminals having Half Duplexing (HD) capability for which the invention does apply. For each HD-FDD terminals, said base station has just to ensure with an appropriate scheduling mechanism that an uplink timeslot (on the uplink frequency band) and a downlink timeslot (on the downlink frequency band) are not allocated during the same period of time.

Figure 4:
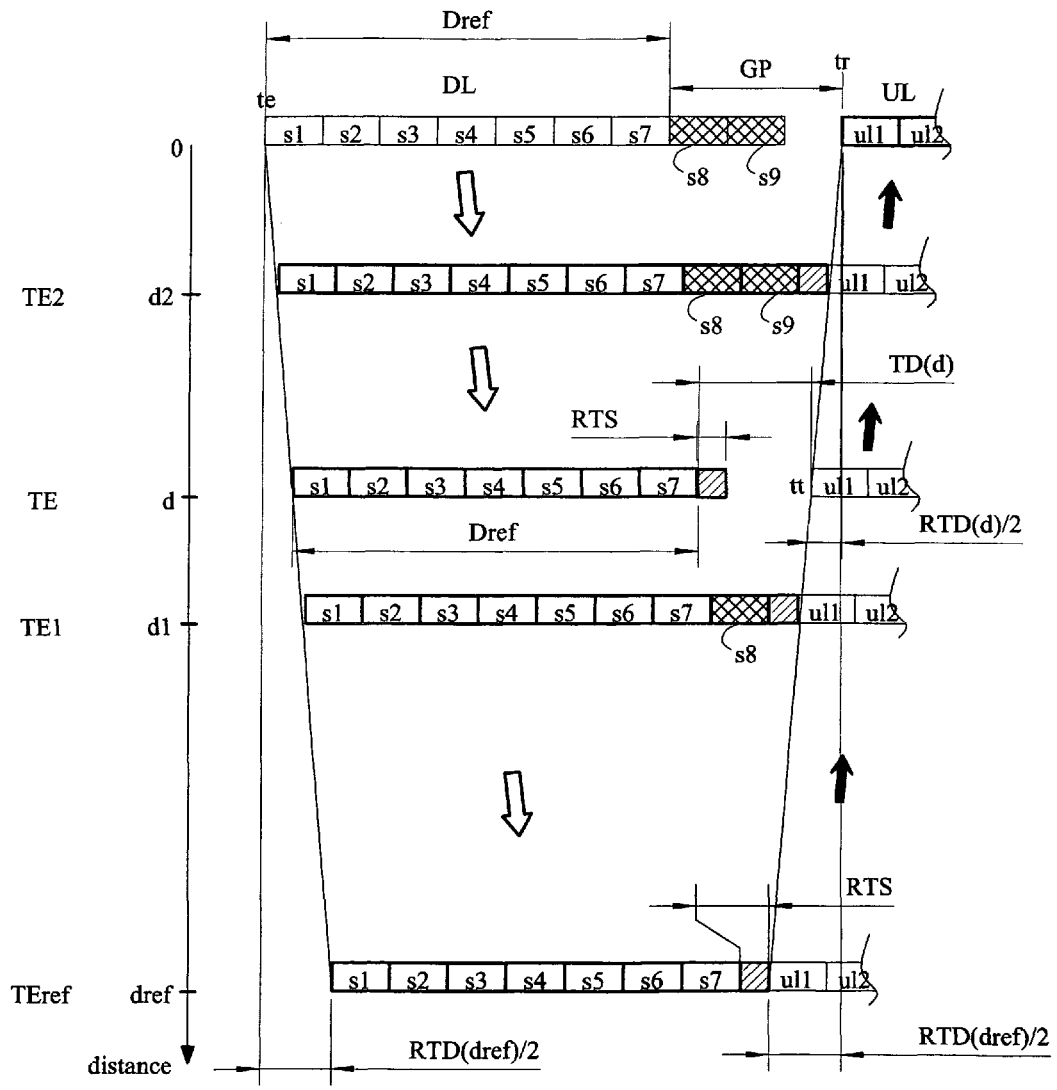
FIG. 4 is a chronogram depicting the transmission of information in the downlink of a telecommunication system according to the invention.

Now let's consider, in relation with FIG. 4, the transmission of $q_j$ symbols (for clarity purposes, $q_j=7$) s1 to s7 (forming what is called here the reference time slot comprising a number of symbols equal to a reference number $n_{ref}$) over the downlink DL by a base station BTS at a time referred to as te. As explained in the preamble of the present description, after having transmitted the last downlink symbol s7 of the reference time slot, the base station BTS has to wait during a period, the so-called guard period GP, up to time tr, for receiving uplink symbols from all the terminals connected thereto. The duration of the reference time slot in the downlink is referred to as Dref corresponding to reference number $n_{ref}$ of symbols, for example seven.

The duration of the guard period GP can be determined in the following way. A terminal TEref at a reference distance dref from the base station BTS, for example at the border of the cell, receives the downlink symbols s1 to s7 of the downlink reference time slot transmitted by the base station BTS with a delay equal to the half of the round trip delay RTD (dref) corresponding to that downlink reference distance dref.

After having received all the downlink symbols s1 to s7 of the downlink reference time slot and switching from the reception mode into the transmission mode (the switching operation lasts RTS), the terminal transmits uplink symbols over the uplink UL, as depicted in thin lines, which uplink symbols are received at the base station BTS within a delay also equal to the half of the round trip delay RTD(dref) corresponding to the reference distance dref. The time tr can thus be determined in the following way:

$tr=te+Dref+RTD(dref)+RTS$

The duration of the guard period GP is then equal to:

$GP=RTD(dref)+RTS$

Note that the guard period GP is independent on the distance d. It is predefined and constant whatever the distance d of a terminal TE from the base station BTS.

A terminal TE at a distance d from the base station BTS receives the downlink symbols s1 to s7 of the reference time slot transmitted by the base station BTS with a delay equal to the half of the round trip delay RTD(d) corresponding to that distance d. After having received all the downlink symbols of the reference time slot, it transmits over the uplink UL at such a time tt that the uplink symbols thus transmitted are received at the aforementioned time tr with a delay which value is equal to the half of the round trip delay RTD(d) corresponding to that distance d. The time delay period TD(d) between the reception of the end of the reference time slot and the transmission over the uplink UL can be expressed as follows:

$TD(d)=tr-te-Dref-RTD(d)=GP-RTD(d)$

Note that the time delay TD(d) depends on the distance d, the longer the distance d, the smaller the time delay TD(d).

Note also that the time delay TD(d) of each terminal connected to the base station BTS can be determined by the base station BTS, for example on basis of pilot signals transmitted by the corresponding terminal and by deducing from the characteristics of said pilot signals the round trip delay RTD(d) of the corresponding terminal.

According to the invention, a base station is provided for including supplementary downlink symbols in a downlink time slot, said supplementary downlink symbols being intended to be transmitted only to the terminals that can receive and process them during the respective time delays thereof.

According to another aspect of the present invention, if for a terminal situated at a distance d from a base station BTS, the time delay TD(d) is comprised between the duration of a number $n_{d1}$ of downlink symbols and the duration of a number $n_{d1}+1$ of downlink symbols, respectively plus the switching time RTS, the base station BTS can insert information for that terminal in $n_{d1}$ supplementary downlink symbols. This condition can be mathematically written as follows:

if $n_{d1} \cdot ts_{d1} \leq TD(d)-RTS<(n_{d1}+1)ts_{d1}$ then insert at most $n_{d1}$ supplementary symbols.

$ts_{d1}$ being the duration of one downlink symbol.

When inserting information for a terminal TE in $n_{d1}$ supplementary downlink symbols, the base station BTS indicates this insertion to that terminal TE (by way of signalling) in order for the terminal TE to read and process these $n_{d1}$ supplementary symbols along with the other symbols.

For example, the base station BTS informs each terminal TE connected thereto about the time delay TD it has to apply. Then, each terminal TE, by using the just above expression, deduces from the value of the time delay TD the number of symbols that it has to read and to process.

The number $n_{d1}$ of supplementary downlink symbols that a base station can allocate to a terminal TE at a distance d of the base station BTS is thus determined in the following way:

$n_{d1}=\text{integer}\{(TD(d)-RTS)/ts_{d1}\}=\text{integer}\{(GP-RTD(d)-RTS)/ts_{d1}\}$ The maximum number $N_{d1}$max of supplementary symbols is given for a terminal TE that would be located at a zero distance from the base station BTS and for which the round trip delay RTD is zero:

$N_{d1}\text{max}=\text{integer}\{(GP-RTS)/ts_{d1}\}$

In the case depicted in FIG. 4, as the number $N_{d1}$max is two, the total number of transmitted downlink symbols is now nine: downlink symbols s1 to s7 of the reference time slot and two supplementary downlink symbols s8 and s9 (cross-hatched) that are transmitted in the period that is usually considered as a guard period GP. The value of the time delay TD(dref) for a terminal TEref at a reference distance dref, generally the distance to the border of the cell, is equal to the switching time RTS in virtue of the definition of the time delay. Only the seven downlink symbols s1 to s7 of the reference time slot are allocated by the base station BTS to said terminal TEref. The terminal TEref only reads and processes those seven downlink symbols s1 to s7, the two supplementary symbols s8 and s9, if any, being ignored.

The value of the time delay TD(d1) for the terminal TE1 is smaller than the duration of two downlink symbols plus the switching time but is however equal to the duration of one downlink symbol plus the switching time RTS. So, the base station BTS can transmit information to that terminal TE1 within at most one supplementary downlink symbol (here the downlink symbol s8 which follows the last downlink symbol s7 of the reference time slot) which is read and processed by said terminal TE1. Symbol s9, if any, is ignored by said terminal TE1. In this case, the total number of downlink symbols that can include information for that terminal TE1 is eight (the seven of the reference time slot s1 to s7 plus one supplementary symbol s8).

The value of the time delay TD(d2) for the terminal TE2 is equal to the duration of two downlink symbols plus the switching time RTS. So, the base station BTS can transmit information to that terminal TE2 within at most two supplementary downlink symbols s8 and s9 which are read and processed by said terminal TE2. The total number of downlink symbols that include information for that terminal TE2 is nine (seven of the reference time slot s1 to s7 plus two supplementary downlink symbols s8 and s9).

The base station BTS can transmit information to any terminal TE located at a distance d of the base station comprised between the distance d1 of the terminal TE1 and the distance d2 of the terminal TE2 with at most eight downlink symbols that it can read and process. In the same way, the base station BTS can transmit information to any terminal located at a distance d lower than the distance d2 of the terminal TE2 within at most nine downlink symbols that it can read and process. Always in the same way, the base station BTS can transmit information to any terminal located at a distance d upper than the distance d1 of the terminal TE1 within at most seven symbols that it can read and process.

Note that the downlink symbol s8 contains information only for the terminals that are located at a distance from the base station BTS lower than d1 whereas downlink symbol s9 contains information only for the terminals that are located at a distance from the base station BTS lower than d2.

Note that the above described process is a dynamical process which means that the allocation can be modified in the course of time. That can be the case because of a terminal changing its position relative to the base station BTS: it can move from a place wherein information for that terminal can be included with at most n supplementary downlink symbols to a place wherein it can be within m (m≠n) supplementary downlink symbols.

When a terminal gets connected, no information about the time delay TD it has to apply has been received. As long as it is not done, the number of symbols allocated to this terminal is equal to the reference number $n_{ref}$. Furthermore, the terminal transmits in the uplink with a time delay equal to the guard period GP after receiving a number of symbols equal to the reference number $n_{ref}$.

The symbols transmitted from (or received at) the base station are generally shared by a plurality of terminals thanks to a multiple access mechanism, e.g. a time division multiple access (TDMA), a frequency division multiple access (FDMA) or a code division multiple access (CDMA). Therefore, together with data, control information has to be transmitted to allow each terminal to multiplex and encode (for uplink transmission) or detect and de-multiplex (for downlink reception) its specific data by using the appropriate multiplexing modulation and coding schemes. Generally, the control information is transmitted in a predefined and reserved part of the timeslot, e.g. the first symbol s1 of the timeslot. Then, this information is used by each terminal to detect its specific data in the following symbols of the timeslot.

Assuming a constant transmit power for all symbols of the timeslot, the supplementary downlink symbols provided by the present invention, when they are added to the downlink timeslot, may allow the use of modulation and coding schemes which are more efficient than in the reference timeslot. Indeed, the energy that is spent during the reference downlink timeslot to reach half duplex terminals, which are far from the base station, i.e., which require a very large transmit power, can be reused during the transmission of the supplementary downlink symbols for other terminals (e.g. half duplex terminals that are close to the base station). As a result, for the supplementary downlink symbols, the closer terminals can benefit from an improved signal to noise ratio, which allows the use for transmission of more efficient modulation and coding schemes and thus further increases the data rate. So, specific control information has to be transmitted to the terminals in order for them to use the new appropriate modulation and coding schemes for multiplexing and detecting the supplementary downlink symbols.

According to the invention, the specific control information related to a supplementary downlink symbol is included within this supplementary downlink symbol, e.g. by multiplexing control information and data either in frequency or in code. As a result, the processing of the reference timeslot is not impacted and no waste of resource is experienced if no supplementary symbol can be transmitted.

In case of an OFDM-based transmission in which several sub-carriers are used per timeslot (as shown in FIG. 2), the control information is for instance time multiplexed with the data during the reference part of the timeslot (e.g. in the first symbol s1 of the timeslot) whereas the control information related to each supplementary downlink symbol is frequency multiplexed within said supplementary downlink symbol.

Note that, if the modulation and coding schemes or the multiplexing of the supplementary downlink symbols do not differ from those of the reference timeslot structure for each terminal, then the control information available in the reference timeslot structure can be used with no need of specific control information in each supplementary downlink symbol.

Figure 5:
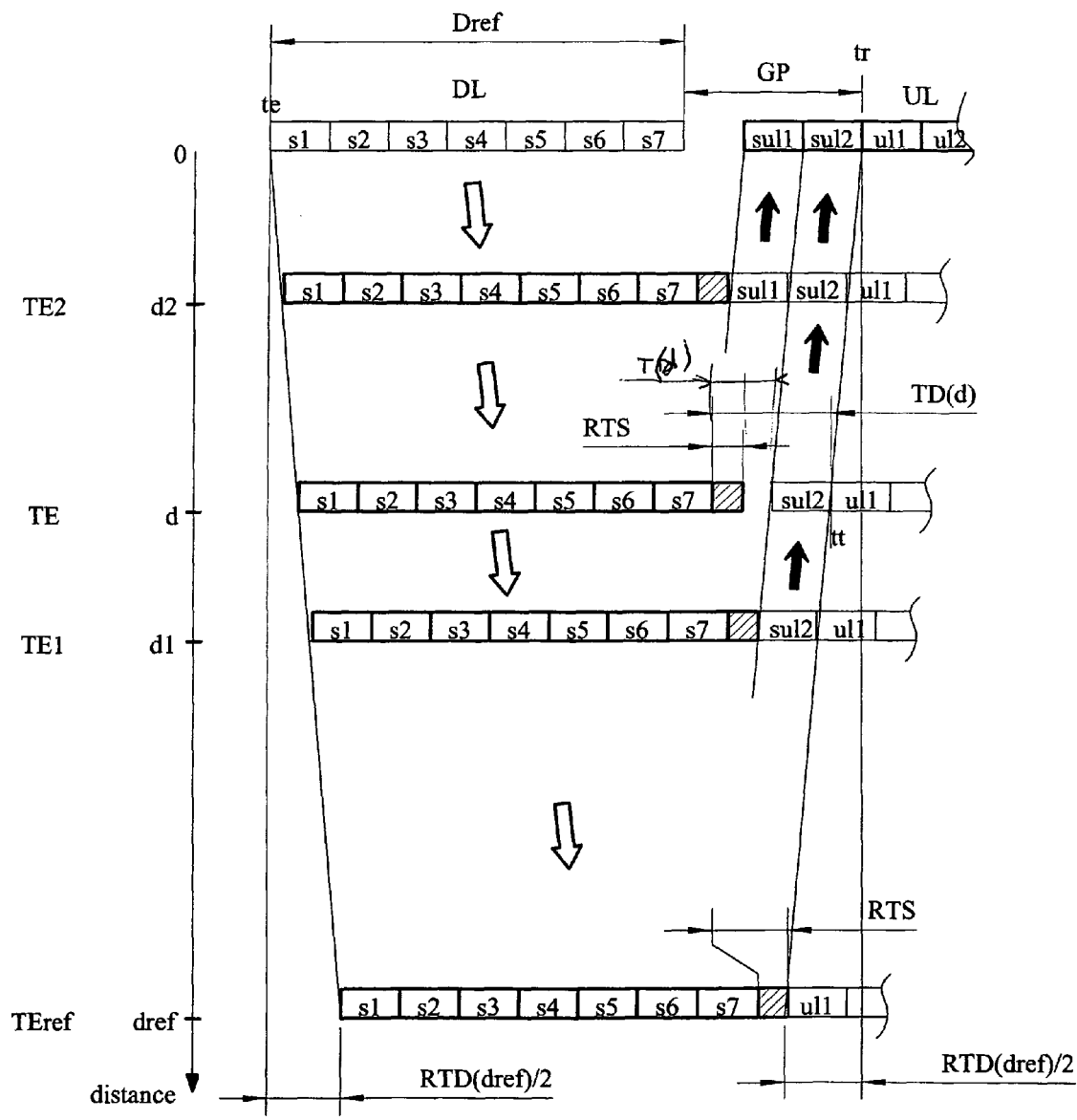
FIG. 5 is a chronogram depicting the transmission of information in the downlink and the uplink of a telecommunication system according to another embodiment of the present invention.

FIG. 5 depicts another embodiment of the present invention referring to the uplink.

In the embodiment illustrated in FIG. 5, the guard period GP is defined in the same way as in the embodiment of FIG. 4, i.e. in relation with the round trip delay RTD(dref) for a terminal TEref at a reference distance dref.

As in the previous embodiment, a terminal TE at a distance d from the base station BTS receives the downlink symbols s1 to s7 of the downlink reference time slot transmitted by the base station BTS with a delay equal to the half of the round trip delay RTD(d) corresponding to that distance d. After having received all the downlink symbols of the downlink reference time slot and having switched from the reception mode to the transmission mode, it should have to wait for a time tt to transmit over the uplink time slot UL, said uplink reference timeslot because it has $q_k$ symbols ($q_k$ being a reference number for the uplink, for example 7). The time tt is such that the first uplink symbols u11 of the uplink reference timeslot thus transmitted by a terminal TE would be received at the base station BTS at the time tr with a delay the value of which is equal to the half of the round trip delay RTD(d) corresponding to that distance d.

The time delay period TD(d) between the reception of the end of the reference downlink timeslot and the transmission of the uplink reference timeslot over the uplink UL can be expressed as follows:

$$TD(d)=tr-te-Dref-RTD(d)=GP-RTD(d)$$

According to the present embodiment of the invention, rather than wait for a time TD(d), the terminal TE transmits a number $n_{u1}$ of supplementary symbols referenced as to su11, su12 in FIG. 5, the number $n_{u1}$ depending on the distance d separating the terminal TE from the base station BTS. The terminal now only waits for a time delay T(d) which is given by the following expression $$T(d)=TD(d)-n_{u1} \cdot ts_{u1}$$

wherein $ts_{u1}$ is the uplink symbol duration.

More particularly, if for a terminal situated at a distance d from a base station BTS, the time delay TD(d) is comprised between the duration of a number $n_{u1}$ of symbols and the duration of a number $n_{u1}+1$ of symbols, respectively plus the switching time RTS, this terminal can insert information for the base station in $n_{u1}$ supplementary uplink symbols. This condition can be mathematically written as follows if $n_{u1} \cdot ts_{u1} \leq TD(d)-RTS<(n_{u1}+1)ts_{u1}$ then insert at most $n_{u1}$ supplementary symbols.

When allowing insertion of information for terminal TE in $n_{u1}$ supplementary symbols, the base station BTS indicates this allowance to that terminal TE (For example, by way of signalling) in order for that terminal TE to transmit these $n_{u1}$ supplementary symbols along with the other uplink symbols.

For example, the base station BTS informs each terminal TE connected thereto about the time delay TD(d) it has to apply. Then, each terminal TE at a distance d of the base station BTS can determine the number $n_{u1}$ of supplementary symbols in the following way:

$$n_{u1}=\text{integer}\{(TD(d)-RTS)/ts_{u1}\}$$

The value of the time delay TD(d1) for the terminal TE1 in FIG. 5 is equal to the duration $ts_{u1}$ of one uplink symbol plus the switching time RTS. So, the terminal TE1 can transmit information to the base station BTS within at most one supplementary uplink symbol (here the symbol referred as to su12 which is before the first uplink symbol u11 of the uplink reference time slot).

The value of the time delay TD (d2) for the terminal TE2 in FIG. 5 is equal to the duration of two uplink symbols plus the switching time RTS. So, the terminal TE2 can transmit information to the base station BTS within at most two supplementary uplink symbols (here the uplink symbols su11 and su12 which are before the first uplink symbol u11 of the uplink reference time slot).

A terminal TE that is separated from the base station BTS by a distance d lower than d2 can transmit two uplink supplementary symbols over the uplink. A terminal TE that is separated from the base station BTS by a distance d comprised between the distance d1 and the distance d2 can only transmit one uplink supplementary symbols over the uplink and a terminal TE that is separated from the base station BTS by a distance d larger than d1 cannot transmit supplementary symbols over the uplink.

Figure 6:
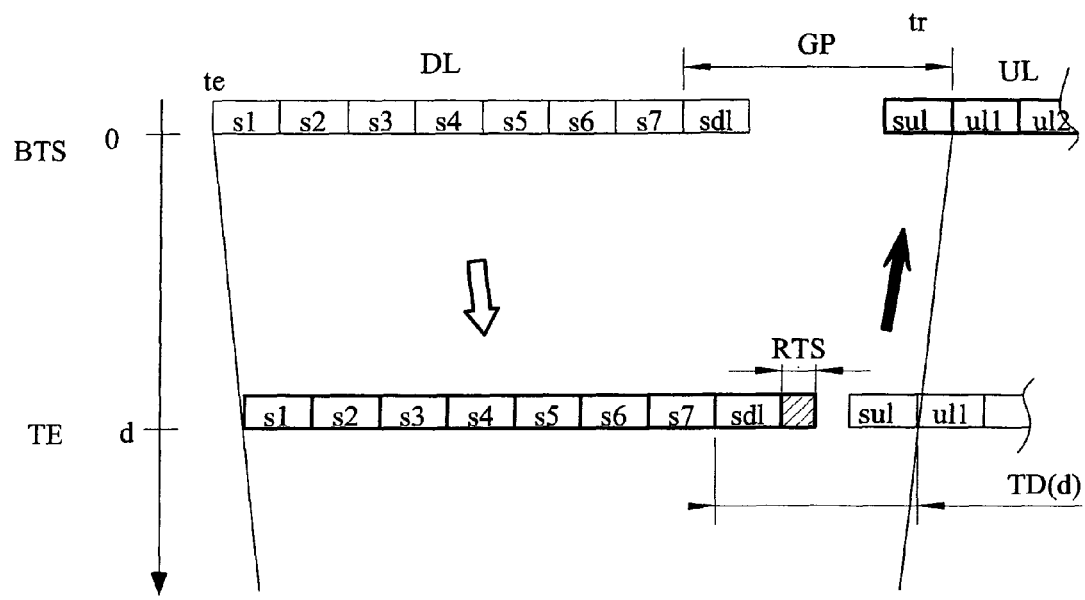
FIG. 6 is a chronogram depicting the transmission of information in the downlink and the uplink of a telecommunication system according to another embodiment of the present invention.

FIG. 6 depicts another embodiment of the present invention wherein the base station BTS can insert in the downlink timeslots downlink supplementary symbols (here one downlink symbol referenced as to sd1) that are transmitted or not to a terminal depending on the distance thereof from the base station BTS and wherein a terminal TE can also insert in the uplink timeslots supplementary uplink symbols (here one symbol referenced as to su1) depending on the distance of the terminal from the base station BTS.

More particularly, the number $n_{d1}$ of supplementary symbols that the base station BTS can insert in the downlink timeslots for a terminal at distance d and the number $n_{u1}$ of supplementary symbols that the same terminal can insert in the uplink must fulfil the following expression:

$$n_{u1} \cdot ts_{u1} + n_{d1} \cdot ts_{d1} < TD(d) - RTS$$

As previously described, the base station BTS can determine the time delay TD(d) for each terminal connected thereto and then allocate to each terminal a number $n_{d1}$ and a number $n_{u1}$. It informs the terminal TE of that point by way of signalling, for example. After having received all the symbols of the downlink reference time slot, the terminal TE receives the $n_{d1}$ following symbols. Then it waits for a time delay T given by the following expression:

$$T(d) = TD(d) - n_{u1} \cdot ts_{u1} - n_{d1} \cdot ts_{d1}$$

Afterwards, it transmits over the uplink $n_{u1}$ supplementary symbols and then the uplink reference timeslot.

When allocating the supplementary symbols in the downlink and the uplink, the base station BTS has to take care not to make an uplink symbol transmitted by a terminal overlapping a downlink supplementary symbol that can be received by another terminal.

The invention claimed is:

1. A wireless telecommunication system, comprising:
a base station configured to communicate with terminals over bidirectional communication channels, each channel supporting frames being divided into downlink timeslots and uplink timeslots, each downlink timeslot including a number of symbols intended to be transmitted to at least a terminal; and
a terminal, after having received all the symbols included in a downlink timeslot followed by an uplink timeslot, configured to transmit other symbols over said uplink timeslot with a time delay depending on a distance between said terminal and said base station so that the transmitted symbols are received by said base station at a time separated from the end of the transmission by the base station of the downlink timeslot by a predefined guard period constant regardless of a distance between the base station and the terminal,
wherein the base station comprises a transmitter configured to transmit at least a supplementary downlink symbol during the guard period to terminals capable of receiving said at least supplementary downlink symbol during the guard period and/or a receiver configured to receive, during the guard period, at least a supplementary uplink symbol from terminals capable of transmitting said at least supplementary uplink symbols during the guard period wherein the base station is configured to determine the time delay of the terminal at distance d from the base station by subtracting from the value of the guard period, a value of a round trip delay RTD(d) for the terminal, and wherein the value of the guard period is given by a value of a round trip delay RTD(dref) for a terminal at a predetermined reference distance dref from the base station plus a Receive Transmit Switch (RTS) time of switching from the reception mode into the transmission mode.

2. The wireless telecommunication system according to claim 1, wherein
the base station is configured to determine a time delay of each terminal connected to the base station, and transmit to a terminal at distance d from the base station, a time delay of which is comprised between a duration of a number $n_{d1}$ of downlink symbols and a duration of a number $n_{d1}+1$ of downlink symbols, respectively plus the Receive Transmit Switch (RTS) time of switching from a reception mode into a transmission mode, at most $n_{d1}$ supplementary downlink symbols, and
the terminal is configured to receive and process said $n_{d1}$ supplementary downlink symbols.

3. The wireless telecommunication system according to claim 1, wherein
the base station is configured to determine a time delay of each terminal connected to the base station;
a terminal, at distance d from the base station and a time delay of which is comprised between a duration of a number $n_{u1}$ of uplink symbols and a duration of a number $n_{u1}+1$ of uplink symbols, respectively plus the Receive Transmit Switch (RTS) time of switching from a reception mode into a transmission mode, is configured to transmit at most $n_{u1}$ supplementary uplink symbols; and
the base station is configured to receive and process said at most $n_{u1}$ supplementary uplink symbols.

4. The wireless telecommunication system according to claim 1, wherein, as long as the time delay for a terminal is not determined, no information is included within any supplementary symbol.

5. The wireless telecommunication system according to claim 1, wherein, as long as a time delay for a terminal is not determined, the time delay for the terminal is considered as equal to the guard period.

6. The wireless telecommunication system according to claim 1, wherein the base station is configured to inform each terminal connected to the base station about a time delay to apply by each terminal connected to the base station.

7. The wireless telecommunication system according to claim 1, wherein said base station uses modulation, coding and/or multiplexing schemes for the supplementary symbols that are different from those used for the symbols of the reference time slots, and said base station transmits specific control information to the terminals that can receive the supplementary symbols for said terminals to detect, decode and de-multiplex said supplementary symbols.

8. The wireless telecommunication system according to claim 7, wherein the base station includes the specific control information related to a supplementary symbol within the supplementary symbol.

9. The wireless telecommunication system according to claim 1, wherein the terminal is configured to receive and process supplementary downlink symbols during the time delay corresponding to the terminal.

10. The wireless telecommunication system according to claim 9, wherein the terminal is configured to determine, from the value of the time delay applied by the terminal a number $n_{d1}$ of downlink supplementary symbols it can receive and process.

11. The wireless telecommunication system according to claim 9, wherein as long as the time delay for a terminal is not determined, a time delay for the terminal is considered to be equal to the guard period.

12. The wireless telecommunication system according to claim 1, wherein the terminal is configured to transmit supplementary uplink symbols during the time delay corresponding to the terminal.

13. The wireless telecommunication system according to claim 12, wherein the terminal is configured to determine, from the value of the time delay applied by the terminal a number $n_{u1}$ of uplink supplementary symbols transmitted during said time delay period.

14. A base station of a wireless telecommunication system, said base station configured to communicate with terminals over bidirectional communication channels, each channel supporting frames divided into downlink time slots and uplink time slots, each downlink time slot including a number of symbols intended to be transmitted to at least a terminal, said base station configured to:
determine a time delay of each terminal connected to the base station, said time delay being such that any terminal after having received all symbols included in a downlink timeslot followed by an uplink timeslot transmits other symbols over said uplink timeslot with said time delay so that the transmitted symbols are received by said base station at a time separated from an end of the transmission by the base station of the downlink timeslot by a predefined guard period that is constant regardless of a distance between said terminal and said base station; and
transmit at least a supplementary downlink symbol during the guard period to terminals capable of receiving said at least supplementary downlink symbol during the guard period and/or receive, during the guard period, at least a supplementary uplink symbol from terminals capable of transmitting said at least supplementary symbol during the guard period wherein the base station is configured to determine the time delay of the terminal at distance d from the base station by subtracting from the value of the guard period, a value of a round trip delay RTD(d) for the terminal, and wherein the value of the guard period is given by a value of a round trip delay RTD(dref) for a terminal at a predetermined reference distance dref from the base station plus a Receive Transmit Switch (RTS) time of switching from the reception mode into the transmission mode.

15. The base station according to claim 14, wherein said base station is further configured to transmit, to a terminal at distance d from the base station and a time delay of which is comprised between a duration of a number $n_{d1}$ of downlink symbols and a duration of a number $n_{d1}+1$ of downlink symbols, respectively plus the Receive Transmit Switch (RTS) time of switching from a reception mode into a transmission mode, at most $n_{d1}$ supplementary downlink symbols.

16. The base station according to claim 14, wherein said base station is further configured to receive, from a terminal at distance d from the base station and a time delay of which is comprised between a duration of a number $n_{u1}$ of uplink symbols and a duration of a number $n_{u1}+1$ of uplink symbols, respectively plus the Receive Transmit Switch (RTS) time of switching from a reception mode into a transmission mode, at most $n_{u1}$ supplementary uplink symbols.

17. The base station according to claim 14 wherein, as long as a time delay for a terminal is not determined, the base station includes no information within any downlink supplementary symbol.

18. The base station according to claim 14, wherein the base station is configured to inform each terminal connected to the base station about a time delay to be applied by each of the terminals connected to the base station.

19. The base station according to claim 14, wherein the base station is configured to use modulation, coding and/or multiplexing schemes for the supplementary symbols that are different from those used for the symbols of the reference time slots, and transmit specific control information to terminals that can receive the supplementary symbols for said terminals to detect, decode and de-multiplex said supplementary symbols.

20. The base station according to claim 19, wherein the base station includes the specific control information related to a supplementary symbol within the supplementary symbol.

21. A transmission method in a wireless telecommunication system including a base station configured to communicate with terminals over bidirectional communication channels, each channel supporting frames divided into downlink timeslots and uplink timeslots, each downlink timeslot including a number of symbols intended to be transmitted to at least a terminal, said method comprising:
transmitting, from the base station to terminals, symbols included in a downlink timeslot;
receiving, by each terminal the symbols included in said downlink timeslot; and
transmitting, by each terminal, other symbols over a subsequent uplink timeslot with a time delay depending on the distance between said terminal and said base station so that the transmitted symbols are received by said base station at a time separated from the end of the transmission by the base station of the downlink timeslot by a predefined guard period that is constant regardless of a distance between the terminal and the base station; and
transmitting, by the base station, at least a supplementary downlink symbol during the guard period to terminals that can receive said at least supplementary downlink symbol during the guard period and/or receiving by said base station during the guard period at least a supplementary uplink symbol from terminals that can transmit said at least supplementary symbol during the guard period, further determining a time delay of a terminal at distance d from the base station by subtracting from the value of the guard period, a value of a round trip delay RTD(d) for the terminal, and wherein the value of the guard period is given by a value of a round trip delay RTD(dref) for a terminal at a predetermined reference distance dref from the base station plus a Receive Transmit Switch (RTS) time of switching from the reception mode into the transmission mode.

22. The transmission method according to claim 21, further comprising:
determining a time delay of each terminal connected to the base station;

allowing said base station to transmit to a terminal at distance d from the base station and a time delay of which is comprised between a duration of a number $n_{d1}$ of downlink symbols and a duration of a number $n_{d1}+1$ of downlink symbols, respectively plus the Receive Transmit Switch (RTS) time of switching from a reception mode into a transmission mode, at most $n_{d1}$ supplementary downlink symbols; and allowing said terminal to receive and process said $n_{dl}$ supplementary symbols.

23. A transmission method according to claim 21, further comprising:

determining a time delay of each terminal connected to the base station;

allowing a terminal at distance d from the base station and a time delay of which is comprised between a duration of a number $n_{u1}$ of uplink symbols and a duration of a number $n_{u1}+1$ of uplink symbols, respectively plus the Receive Transmit Switch (RTS) time of switching from a reception mode into a transmission mode, to transmit at most $n_{u1}$ supplementary uplink symbols, and allowing the base station to receive said at most $n_{u1}$ supplementary uplink symbols.

24. The transmission method according to claim 21, wherein as long as a time delay for a terminal is not determined, no information is included within any supplementary symbol.

25. A transmission method according to claim 21, further comprising:

informing each terminal connected to the base station about a time delay to be applied by each of the terminals.

26. The transmission method according to claim 25, wherein, as long as a time delay for a terminal is not determined, a time delay for that terminal is considered to be equal to the guard period.

27. A transmission method according to claim 21, further comprising:

using, by the base station, modulation, coding and/or multiplexing schemes for the supplementary symbols that are different from those used for the symbols of the reference time slots, and transmitting, by the base station, specific control information to the terminals that can receive the supplementary symbols for said terminals to detect, decode and to de-multiplex said supplementary symbols.

28. The transmission method according to claim 27, wherein the specific control information related to a supplementary symbol is included within the supplementary symbol.

* * * * *